(12) United States Patent
Lodhia et al.

(10) Patent No.: US 10,817,266 B2
(45) Date of Patent: *Oct. 27, 2020

(54) CONVERTING A CAPTURED IMAGE TO VISUAL PROGRAMMING LOGIC FOR AN AUTOMATION BUILDING TOOL

(71) Applicant: salesforce.com, inc., San Francisco, CA (US)

(72) Inventors: Rahmaan Lodhia, Johns Creek, GA (US); Jeffrey Geiger, Denver, CO (US); Michael Diffenderfer, Atlanta, GA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,405

(22) Filed: Sep. 25, 2018

(65) Prior Publication Data

US 2020/0097263 A1 Mar. 26, 2020

(51) Int. Cl.
G06F 8/34 (2018.01)
G06N 20/00 (2019.01)

(52) U.S. Cl.
CPC .............. *G06F 8/34* (2013.01); *G06N 20/00* (2019.01)

(58) Field of Classification Search
CPC ...................................... G06F 8/34; G06F 8/30
See application file for complete search history.

(56) References Cited

U.S. PATENT DOCUMENTS

| | | | |
|---|---|---|---|
| 4,867,596 A * | 9/1989 | Ocuin | F16B 7/0446 403/170 |
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |

(Continued)

*Primary Examiner* — Wei Y Zhen
*Assistant Examiner* — Brahim Bourzik
(74) *Attorney, Agent, or Firm* — Dergosits & Noah LLP; Todd A. Noah (57) ABSTRACT

Described is a mechanism that converts a captured image (e.g. hand drawn image) of a process flow diagram into visual programming logic. The mechanism may analyze the image using a machine learning component to recognize various shapes within the image that correspond to various operations (e.g. nodes of a graph). The mechanism may then determine a process flow within the image (e.g. edges of a graph) based on the position of each shape relative to a top-most shape. The recognized operations and process flow may then be automatically provided to the building tool. The building tool may then display the process flow diagram as visual programming logic for an executable program. Accordingly, the mechanism provides the ability for a user to conveniently create programming logic and forego the process of building a program using only programming code or visual tools.

17 Claims, 9 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,400,771 B2 * | 7/2008 | Li | G06K 9/222 382/181 |
| 7,401,094 B1 | 7/2008 | Kesler | |
| 7,519,947 B2 * | 4/2009 | Shukla | G06F 8/34 717/113 |
| 7,530,050 B2 * | 5/2009 | Mohan | G06F 8/20 717/100 |
| 7,620,655 B2 | 11/2009 | Larsson | |
| 7,698,160 B2 | 4/2010 | Beaven et al. | |
| 7,730,478 B2 | 6/2010 | Weissman | |
| 7,779,039 B2 | 8/2010 | Weissman et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,131,663 B1 * | 3/2012 | Taylor | G06F 8/34 706/59 |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0063594 A1 * | 3/2005 | Li | G06K 9/222 382/206 |
| 2005/0091098 A1 | 4/2005 | Brodersen et al. | |
| 2005/0283758 A1 * | 12/2005 | Cobcroft | G06F 8/34 717/113 |
| 2006/0074735 A1 * | 4/2006 | Shukla | G06F 8/34 705/80 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2012/0213429 A1 * | 8/2012 | Vasudevan | G06K 9/00476 382/162 |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0208081 A1 * | 7/2014 | Yap | G06F 8/445 712/227 |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |
| 2016/0018962 A1 * | 1/2016 | Low | G06F 3/0481 715/771 |
| 2017/0168676 A1 * | 6/2017 | Calder | G06F 3/0482 |

* cited by examiner

CONVERTING A CAPTURED IMAGE TO VISUAL PROGRAMMING LOGIC FOR AN AUTOMATION BUILDING TOOL

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This disclosure relates to a building tool, and more particularly, providing the ability to automatically convert and image into visual programming logic for the building tool.

BACKGROUND

Various customer relationship management (CRM) software tools exist to aid organizations with managing interactions with customers and potential customers. These tools often include capabilities that allow an organization to create a program to automate various tasks. For example, these tools may be used to create a program to automate various marketing tasks. As one example, an automation builder may allow a user (e.g. marketing professional) to visually create a program for an automated email marketing campaign. Such an automation builder, however, may require a certain degree of programming acumen and effort. Accordingly, the potential user base for such a program may be limited to users that are comfortable working in a programming environment, or have been adequately trained to work within such an environment. For example, in the context of an automated marketing program, marketing professionals may have to defer a marketing campaign creation process to a development team. Naturally, utilization of a development team increases the resources required for such an endeavor. Accordingly, there is a need to further provide user-friendly capabilities and functionality for automation building tools to increase the potential user base for such tools.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a mechanism that converts a drawing (or captured image) using an artificial intelligence (AI) engine into programming code that may be displayed as visual programming logic. Accordingly, the mechanism allows a user to create a hand-drawn process flow diagram that can be automatically converted into visual programming logic for an automation building tool that is used to create an automated program. For example, the automation building tool (or automation builder) may provide a visual interface to create a program using visual components.

In some embodiments, the hand-drawn process flow diagram may be uploaded to a system which performs a shape recognition for nodes of the process flow diagram using a machine learning algorithm. The mechanism may then determine various operations of the process flow diagram that correspond to the approximated shapes. For example, distinct shapes may be used for each operation type that may be available within the automation building tool.

In some embodiments, once various operations (or shapes, or nodes) of the process flow diagram have been approximated, the mechanism may determine a logic flow based on the relative positions of each operation relative to a reference point (e.g. topmost operation/node). Based on the determined positions, the mechanism may create edges between the nodes of the process flow diagram. These edges may then be used the determine the logic flow between operations of the process flow diagram. The determined (or approximated) operations and process flow may then be automatically provided to the automation building tool, which in turn, automatically converts the information into programming code. The programming code may then by displayed by the automation building tool as visual programming logic that is executable as an automated program.

In some embodiments, the process flow diagram may be provided (or converted) into a graph structure. For example, as part of the interface of the automation building tool, the visual programming logic may be represented as a directed acyclic graph (DAG) such that the nodes of the graph correspond to various operations and the edges of the graph correspond to the logic flow of the program. For example, when building an automated program within the automation building tool, a user may visually connect various operations and create a workflow. For example, the workflow may be part of a marketing campaign such as an automated email marketing procedure.

Accordingly, the mechanism may provide the ability for a user (e.g. non-developer) to forego the potentially tedious process of building a program within the automation building tool using a programming language or visual tools. Instead, a user may hand-draw a workflow (e.g. process flow diagram) for an automated procedure which then may be uploaded and automatically converted into working programming code. Thus, the complexity for creating such a program is greatly reduced. Moreover, the mechanism opens up the development process to a potentially greater set of users that may otherwise not be familiar with creating a program within a programming environment.

Accordingly, described is mechanism for an efficient and user-friendly mechanism for automatically converting an image to visual programming logic within an automation building tool. As further described herein, such a mechanism may be provided within an operating environment as described in FIG. 1.

Figure 1:
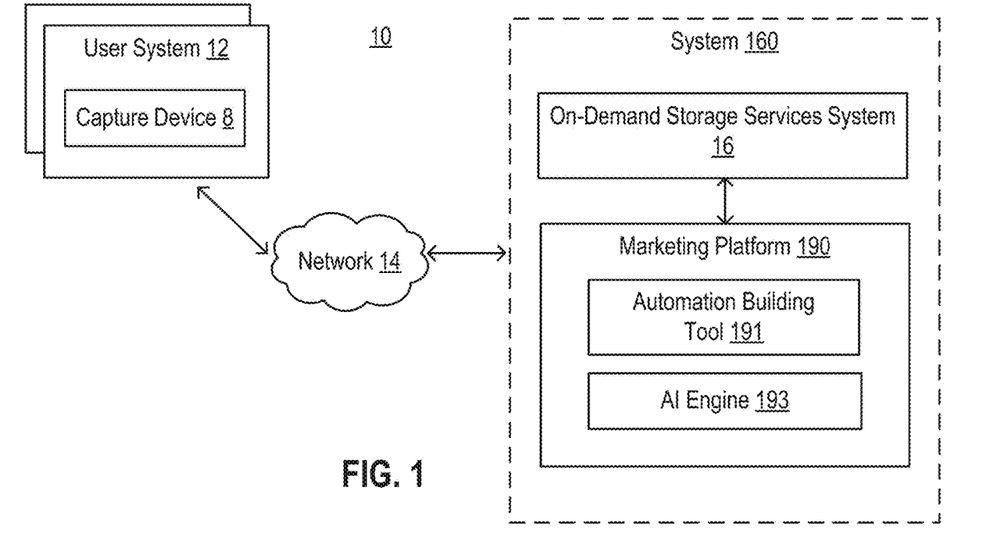
FIG. 1 is a block diagram illustrating an example overview of an operating environment for converting an image to visual programming logic for an automation building tool according to one or more embodiments of the disclosure.

FIG. 1 is a block diagram illustrating an example overview of an operating environment 10 for converting an image to visual programming logic for an automation building tool according to one or more embodiments of the disclosure.

As shown, a general overview of operating environment 10 may include a user system 12, a system 160, which may include an on-demand database services system (or platform) 16, and a marketing platform 190, which may all interact via a network 14. The network may be any type of wired or wireless network including a local area network (LAN), a wide area network (WAN), or a direct communication link, or other suitable connection.

As further described herein, the user system 12 may include a computing device (e.g. computer, smartphone, etc.). As shown in this example, the user system 12 may include a capture device 8 such as a camera, scanner, or other component for capturing an image. As referred to herein, a captured image (or image) may include any form of digital image from any suitable source and in any suitable format (e.g. jpeg, png, gif, etc.). For example, a source may include a hand-drawn picture (e.g. on paper, or a whiteboard) that is converted into a digital format. For example, the image may be scanned into the user system 12, or may be the result of a user taking a picture of a whiteboard or sketch using the user system 12 (e.g. smartphone). Accordingly, such a captured image may then be uploaded into system 160. Alternatively, system 160 may obtain a captured image directly.

As further described herein, system 16 may provide an on-demand database service to customers. As part of, or in conjunction with, an on-demand service, the system 160 may also include a marketing platform 190. The marketing platform (or system) 190 may include various tools or components available to organizations for managing customers or potential customers. For example, the marketing platform may access customer data that may be stored as part of system 16 and perform various tasks or analysis. In one embodiment, the marketing platform may include an automation building tool 191, an AI engine 193, and various other components. It should be noted that marketing platform 190, automation building tool 191, and AI engine 193, or a combination thereof, may be part of system 16.

As further described herein, an automation building tool 191 (or building tool, or builder, or tool) may provide the ability to create a program (or automated program) in a visual manner. For example, a user (or developer) may create visual programming logic represented as a directed acyclic graph (DAG) where nodes of the DAG represent various operations performed by a system.

As further described herein, the AI engine 193 may perform various analysis functions. In one embodiment, the AI engine 193 may include various machine learning components to provide various services that provide results, predictions, or recommendations based on an organization's unique business processes and customer data. Accordingly, the AI engine 193 may include various services (or APIs) that may be used in conjunction with various other components. For example, as further described herein, a machine learning component (e.g. service) may be accessed to provide information used by the automation building tool 191. For example, the automation building tool 191 may obtain data provided by a machine learning component as part of the process of converting an image into visual programming logic.

As described, the automation building tool 191 may allow a user to create an automated program within a visual interface. An example of such an interface is described in FIG. 2.

Figure 2:
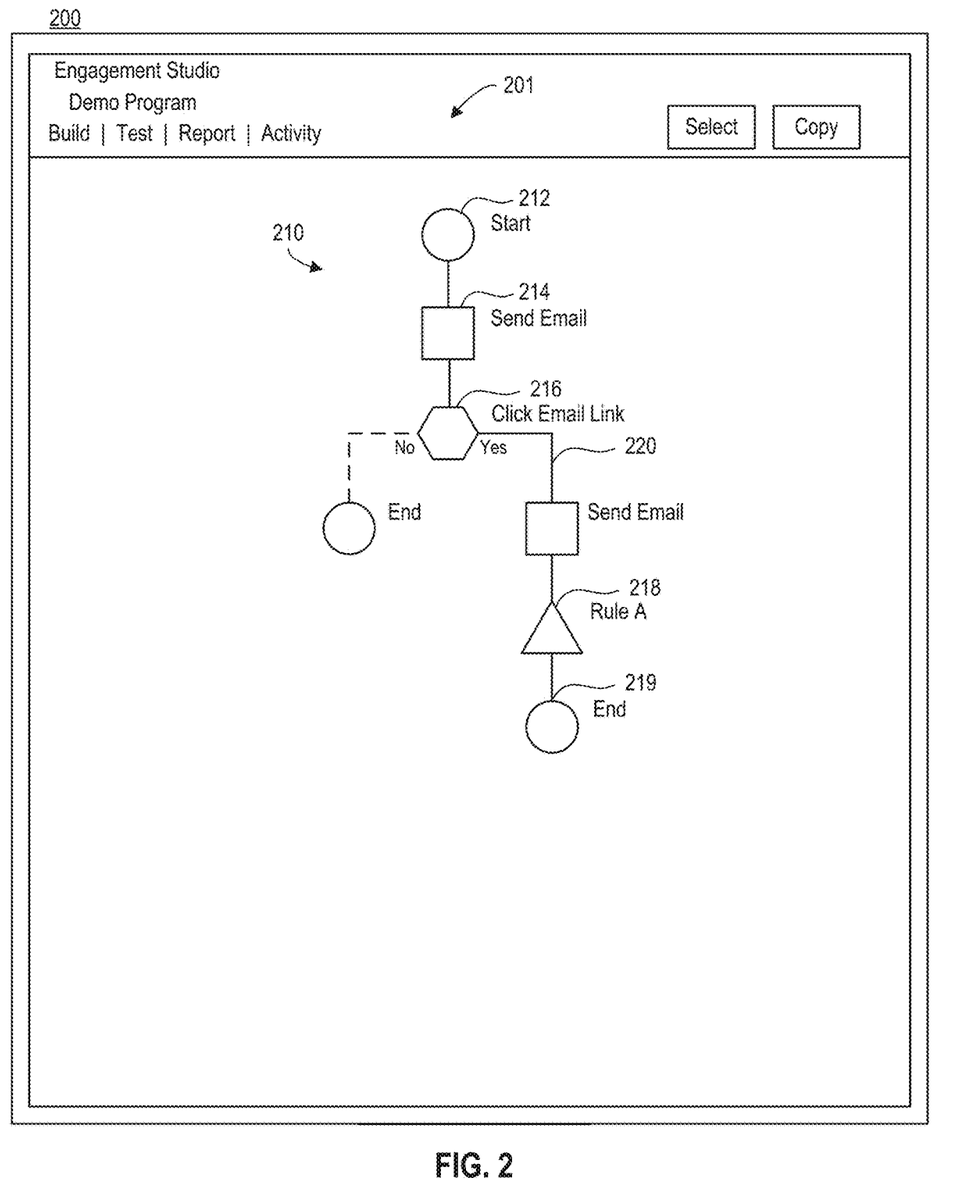
FIG. 2 is a diagram illustrating an example automation building tool interface used to create visual programming logic according to one or more embodiments of the disclosure.

FIG. 2 is a diagram 200 illustrating an example building tool interface 201 used to create visual programming logic according to one or more embodiments of the disclosure. As shown, automation building tool (e.g. automation building tool 191) may include an interface 201 that allows a user to visually create a program (e.g. "Demo Program" as shown in this example). For example, the program (or automation, or automated program) may provide an automated email marketing campaign. It should be noted that although the examples described herein relate to an automated email marketing procedure, any type of program or automation is contemplated.

As shown, the program or visual programming logic (or logic) may be represented as a DAG 210. Accordingly, in some embodiments, the program may adhere to a DAG flow structure (e.g. no cycles). It is contemplated, however, that other programming structures may be used. The DAG 210 may include a plurality of nodes that each correspond to a particular type of operation.

As referred to herein, an operation may include a component of a program such as a method, function, task, procedure, etc. that may be performed by the system. When building or creating a program, a user may select operations (e.g. nodes) that are connected (e.g. via edges) to create a particular program that follows a logical flow.

In some embodiments, the logical flow may adhere to a structure of a DAG. In this example, the type of operations may include a start operation 212, an action operation 214, a trigger operation 216, a rule operation 218, and a stop operation 219, which are connected (or joined) by one or more edges 220 that describe the program flow (or process flow).

In one embodiment, the operations may be selected from a specific set of available types of operations. For example, the building automation tool may provide a predefined set of types of operations. For example, as provided in this example related to an email marketing program, the predefined set of operations may include a start (or begin) operation, an action operation, a trigger operation, a rule operation, and a stop (or end) operation. A start operation may designate the start of a program path, and an end operation designate the end of a program path. An action operation may perform various actions at a given point in time. For example, in the context of an email marketing program, an action operation may include operations such as send an email, add a user/customer to a list, adjust a score associated with a user/customer, and any other actions. A trigger operation may wait (or listen, monitor, etc.) for a particular event (or characteristic, action, etc.). In addition, the trigger operation may act as a decision tree where the program path (or logic flow) may split based on the occurrence of a particular event (e.g. yes/no decision tree). For example, the trigger operation may listen for an event such as opening an email, clicking an email link 216, submitting a form within a specified number of days, or any other events. A rule may check for specified criteria or values within the system. For example, a rule operation may check or verify a particular field related to a customer (e.g. prospect). As shown, in some embodiments, each type of operation may correspond to a particular node shape (e.g. circle, square, hexagon, triangle, etc.). It should be noted that other indicators (e.g. colors) may also be used to distinguish between operations and types of operations.

As described, in addition to building a program within the building tool interface 201, a user may import programming logic, for example, by providing a hand-drawing of a workflow (e.g. process flow diagram), which the system may automatically convert into executable programming code. Accordingly, in some embodiments, an interface of the building tool may provide an option to import a captured image as shown in FIG. 3.

Figure 3:
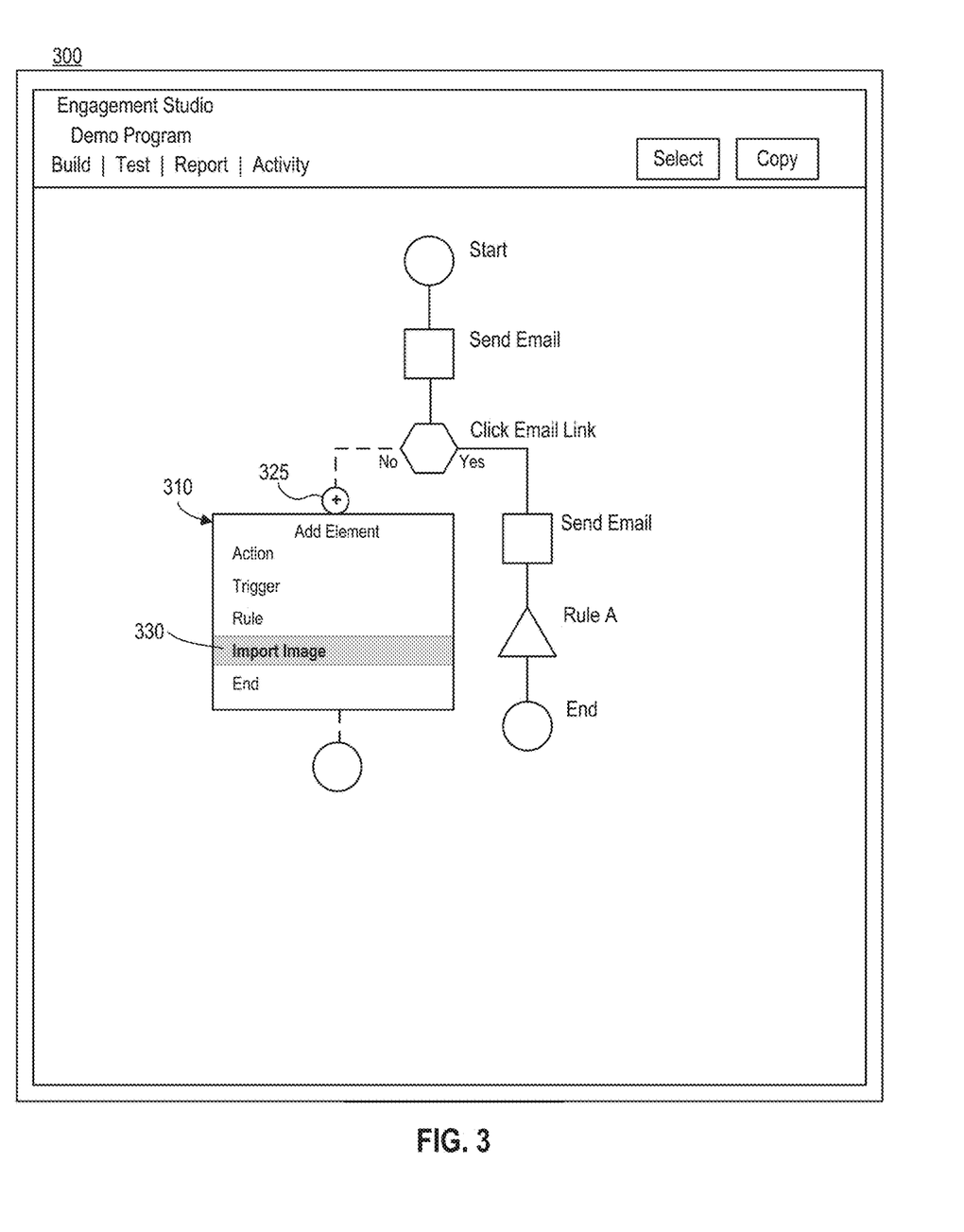
FIG. 3 is a diagram illustrating an example interface providing an option to import a captured image to be converted into visual programming logic according to one or more embodiments of the disclosure.

FIG. 3 is a diagram 300 illustrating an example interface providing an option to import a captured image to be converted into visual programming logic according to one or more embodiments of the disclosure. As shown in this example, the system may provide a menu item (or listing) 310 including options for adding elements to a program (e.g. DAG 210). In one embodiment, the menu 310 may be provided in response to a user selecting an insertion point within the DAG. For example, edges of the DAG may provide a selectable insertion point 325, which when selected (or clicked) may display the menu 310. As shown in this example, the menu 310 may include options to add one or more elements (e.g. operation types), as well as an option to import an image 330. In response to selecting the option to import an image 330, the system may provide the ability to select or upload an image file (e.g. via a file explorer, or finder application, drag-and-drop operation, etc.). As shown in this example, a user may be provided with a menu item to add logic to an already existing program. In addition, the programming logic may be used to create a new program or initial process flow. Accordingly, the system provides an intuitive and convenient method for a user to select an image file of a hand-drawn process flow diagram to be imported into the building tool. An example of such a hand-drawn process flow diagram is shown in FIG. 4.

Figure 4:
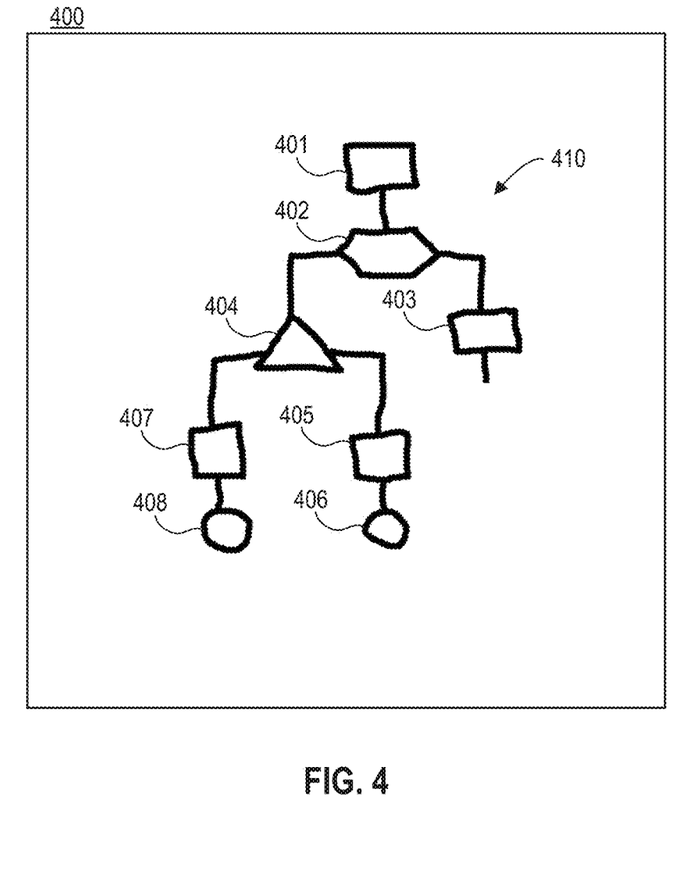
FIG. 4 is a diagram illustrating an example hand-drawn process flow diagram that may be converted into visual programming logic according to one or more embodiments of the disclosure.

FIG. 4 is a diagram 400 illustrating an example hand-drawn process flow diagram that may be converted into visual programming logic according to one or more embodiments of the disclosure. In some embodiments, the hand-drawn process flow diagram may mimic or follow the same structure (e.g. graph) structure of a DAG that would be used in the building tool. As shown, the process flow diagram may include nodes 410 (or shapes) that represent particular operations (operations 401-408). As shown in this example, the nodes represent shapes that uniquely identify various types of operations, for example, as described in the example of FIG. 2. Accordingly, in operation, a user may provide (e.g. upload, share, select, etc.) a captured image of the process flow diagram (e.g. captured via a camera or scanner) to the system. In response to a user providing such an image file, the system may perform a conversion process as further described herein, and insert the converted image as visual programming logic into a program (e.g. an existing DAG) as shown in FIG. 5.

Figure 5:
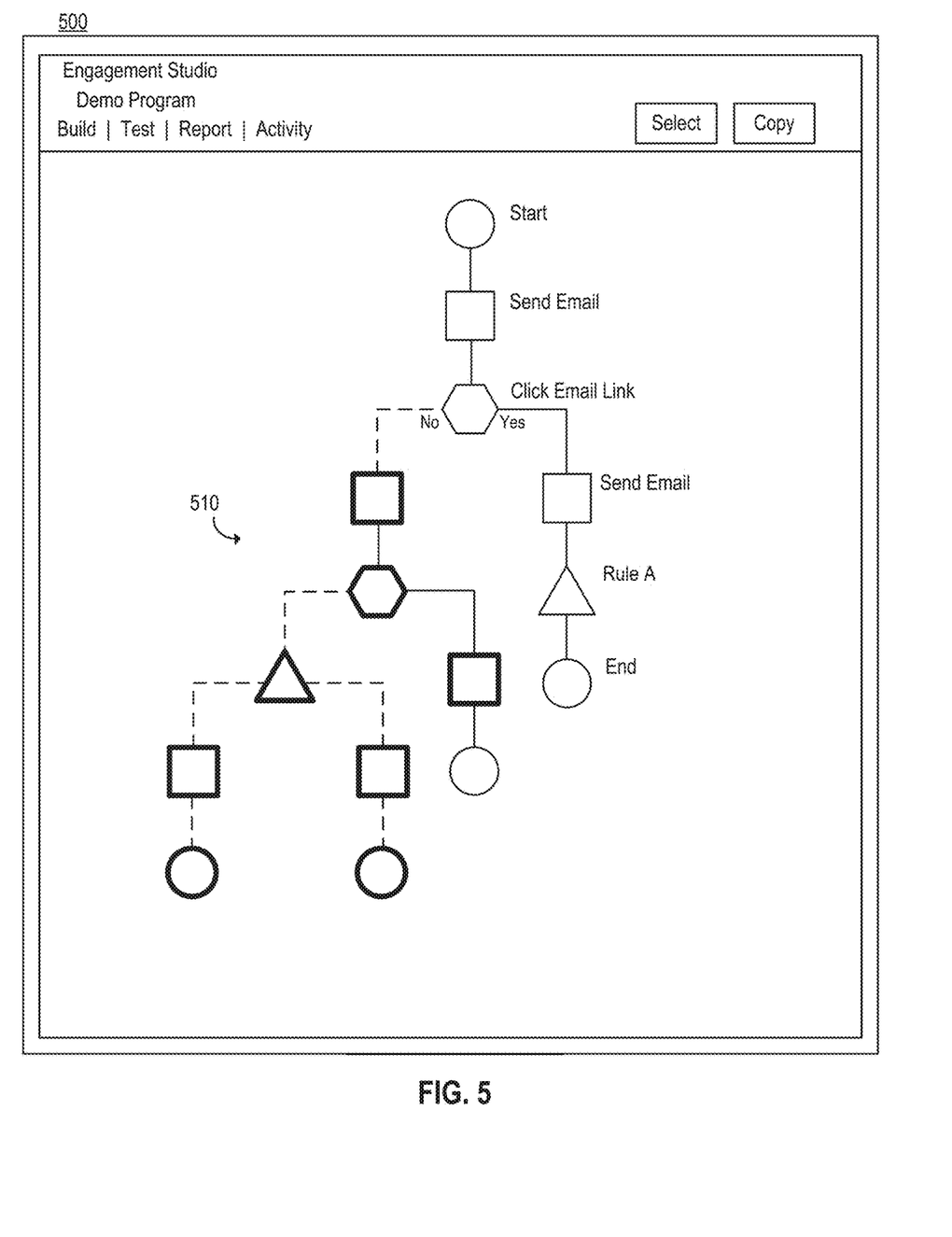
FIG. 5 is a diagram illustrating an example interface after inserting a converted image of the hand-drawn process flow diagram of FIG. 4 into a building tool as visual programming logic according to one or more embodiments of the disclosure.

FIG. 5 is a diagram 500 illustrating an example interface after inserting a converted image of the hand-drawn process flow diagram of FIG. 4 into a building tool as visual programming logic according to one or more embodiments of the disclosure.

As shown, the converted portion of programming logic 510 may be inserted into the program (e.g. within the DAG). As shown in this example, the visual programming logic has been inserted at the inserted point (e.g. 325) of the DAG. In some embodiments, prior to inserting the converted visual programming logic, the system may perform a verification to ensure the programming logic is compatible with an existing DAG logic flow. Such a verification process is further described herein. It should be noted that as shown in this example, the original process flow diagram may mimic the DAG structure/format (e.g. particular shapes corresponding to operations) of the building tool to provide a consistent user experience. However, the system may also incorporate process flow diagrams that may follow a different structure than a DAG (or different shapes) as used by the building tool. For example, a process flow diagram (or flow chart) that includes a loop structure may be translated into a branch structure that would be consistent with a DAG (e.g. no cycles). Accordingly, the system may perform a further translation and adapt the logic flow to be compatible with the logic flow of the building tool.

Figure 6:
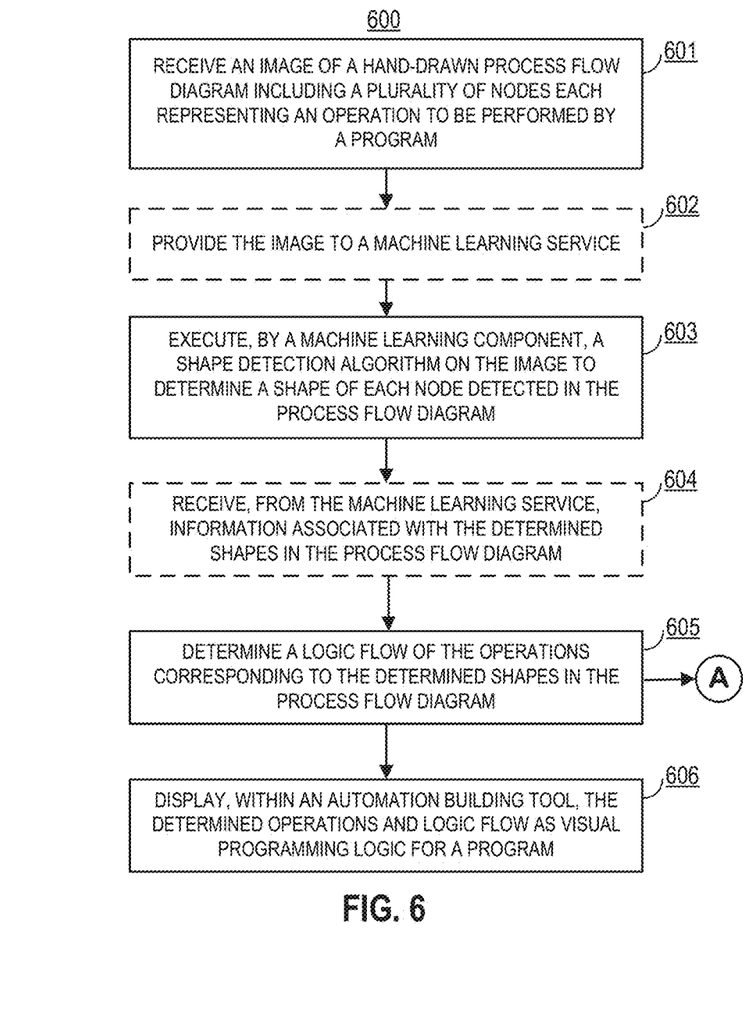
FIG. 6 is a process flow diagram illustrating an example method of converting an image to visual programming logic within an automation building tool according to one or more embodiments of the disclosure.

FIG. 6 is a process flow diagram 600 illustrating an example method of converting an image to visual programming logic within an automation building tool according to one or more embodiments of the disclosure. Process 600 may use processing logic, which may include software, hardware, or a combination thereof. For example, process 600 may be performed by a system including one or more components described in the operating environment 100 (e.g. system 160, or automation building tool 191, AI engine 193, or a combination thereof). It should be noted that the processing steps described herein may be performed in any order, and one or more of such processing steps may be performed in parallel.

In 601, the system may receive an image of a process flow diagram. In one embodiment, the system may receive the image in response to receiving, within the automation building tool, a selection to import the image into the program. For example, the selection may specify an insertion point (e.g. insertion point 325) for the visual programming logic within the DAG as shown, for example, in the examples of FIGS. 3-5.

In one embodiment, the image may be a captured image from a hand-drawn diagram (e.g. drawn on paper, or a picture from a whiteboard, etc.). The diagram may include a process flow diagram, flow chart, a set of operations, or a like type diagram representing a set of operations and a logical flow between the operations. For example, the logic flow may be represented as a top-down ordering of nodes within the diagram. In addition, the logic flow may be represented by connections such as lines or arrows between the operations. The process flow diagram may represent a structure of a program to be created by a user.

In one embodiment, an automation building tool may be used to create a such a program. Accordingly, the process flow diagram (e.g. flow chart) may include a plurality of nodes each representing an operation to be performed by the program. As described, an automation building tool may identify various types of operations based on a shape the node. For example, each type of operation may be identified using a particular shape. In one embodiment, the operations may include a start/end operation (e.g. circle), an action operation (e.g. square), a trigger operation (e.g. hexagon), and a rule operation (e.g. triangle), for example, as shown in the examples described above. It should be noted that other forms of identifiers may also be used to identify particular operations. For example, each shape may include a portion a text that is used to identify a particular operation. For example, each shape may be the same, but include text (e.g. "start," "action," "trigger," "rule," and "end," or related short forms). As another example, the user may provide a particular color to identify each type of operation. For instance, each operation may have a corresponding color (e.g. blue, red, green, etc.).

As described, in some embodiments, the received image may be processed using a machine learning component. In some embodiments, the machine learning component may be accessed via an API or service. Accordingly, in some embodiments, the system may provide the image to a machine learning service. As described, the system may leverage machine learning capabilities to approximate the intended operations represented in the hand-drawn image. Accordingly, machine learning components may be trained using various techniques. For example, in one embodiment, the system may receive (or obtain) a set of training data including one or more labeled shapes, and a machine learning component may be trained to classify elements within various images based on the training data.

In 602, the system may determine a shape of each node detected in the process flow diagram. In one embodiment, the system may utilize a machine learning component (e.g. service) to execute (or perform) a shape detection within the image. For example, the machine learning component may include image classification functions. As described, the shape of each node may correspond to an operation type. In operation, the system may perform an approximation to determine each shape within the diagram. In one embodiment, determining the shape of each node may include selecting the shape that most closely matches a shape from a predefined set of shapes. For example, the predefined set of shapes may include a unique shape for a predefined set of operations available within the automation building tool. In one embodiment, the predefined set of operations available within the automation building tool may include a start operation, an end operation, an action operation, a trigger operation, and a rule operation.

As noted, other identifiers, in addition to or as an alternative to shapes, may be used to identify operations. Accordingly, the system (or machine learning component) may perform various other forms of detection such as text detection (e.g. optical character recognition), color detection, size and/or orientation detection, or a combination thereof, to identify various operations. Accordingly, such detection information or results may be provided as output. In some embodiments, the information may be further processed by the system.

As described, in some embodiments, the system may utilize a machine learning component (e.g. service) to perform shape detection. In such embodiments, the machine learning component may provide (e.g. as output) information associated with the determined shapes in the process flow diagram. For example, the machine learning component may provide a listing of shapes detected in the image. The information may be provided in any suitable format (e.g. JSON, XML, etc.). In some embodiments, the machine learning component may also provide additional information such as information related to detected edges of a diagram, sequence of operations, and any other information. For example, the machine learning component may also provide (e.g. determine) the logic flow between operations as further described.

In 603, the system may determine a logic flow of the operations corresponding to the determined shapes in the process flow diagram. In some embodiments, when determining the logic flow, the system may perform one or more additional processes (or subprocesses) as described in FIG. 7.

Figure 7:
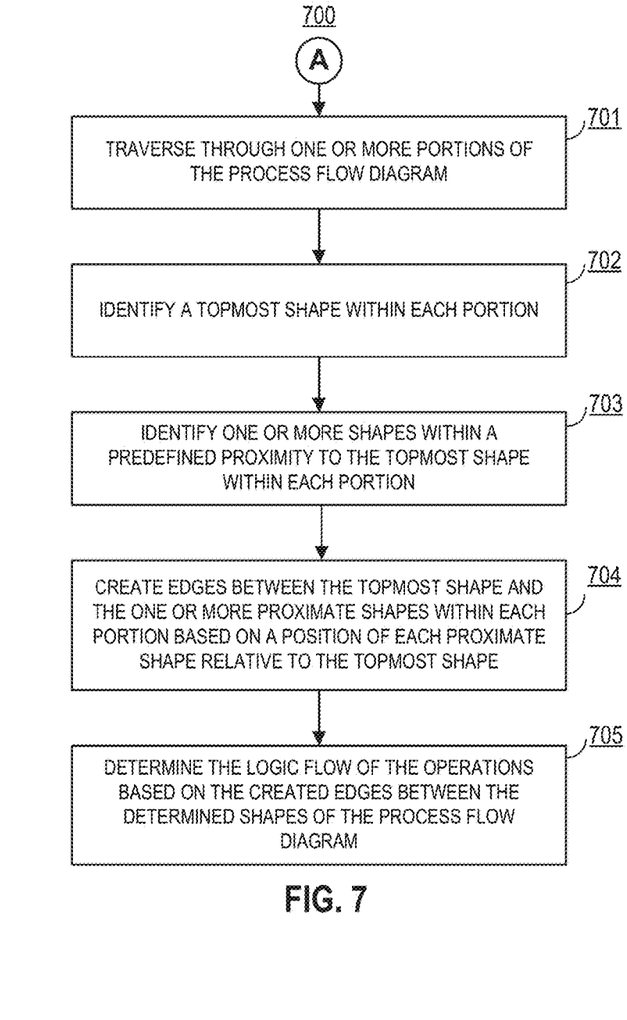
FIG. 7 is a process flow diagram illustrating an example method of determining a logic flow between determined operations of an image as part of the process of converting the image to visual programming logic according to one or more embodiments of the disclosure.

FIG. 7 is a process flow diagram 700 illustrating an example method of determining a logic flow between determined operations of an image as part of the process of converting the image to visual programming logic according to one or more embodiments of the disclosure. Process 700 may use processing logic, which may include software, hardware, or a combination thereof. For example, process 700 may be performed by a system including one or more components described in the operating environment 100 (e.g. system 160, or automation building tool 191, AI engine 193, or a combination thereof).

As part of the conversion process, the system may determine a logic flow (or process flow, sequence, ordering, etc.) between operations provided in the image. For example, the system may determine the structure of edges between nodes (or operations, or shapes) provided in the image. In some embodiments, the system may attempt to detect or infer drawn edges (e.g. lines, or arrows) connecting the nodes, or may determine the logic flow based on relative positions of nodes alone (e.g. without attempting to detect or infer drawn edges), or with a combination of both. Accordingly, the system may determine a logic flow in situations where a user does not draw connections (e.g. lines, arrows, etc.) between nodes, as well as in situations where a user does in fact provide such connections (e.g. as shown in FIG. 5).

The system may traverse the determined operations (or nodes, or shapes) in various ways. In one embodiment, the system may traverse (or analyze, or iterate through, etc.) the operations in using various techniques such as a top-down approach. In addition, the system may traverse the entire image at once, or may traverse the image in one or more portions. As described in this example, the system may analyze the image in portions.

For example, in 701, the system may traverse through one or more portions of the process flow diagram. As described, in one embodiment, the system may traverse the image starting from a top of the process flow diagram to a bottom of the process flow diagram. Accordingly, for each portion of the image the system may perform a processing. In 702, the system may identify a topmost shape within each portion (e.g. node 401 as shown in FIG. 4.). In 703, the system may identify one or more shapes within a predefined proximity to the topmost shape within each portion (e.g. nodes 402, 403, and 404). In 704, the system may create edges between the topmost shape and the one or more proximate shapes within each portion based on a position of each proximate shape relative to the topmost shape. For example, a shape positioned substantially or directly under a topmost shape may infer an edge (e.g. connection) between the two shapes. In addition, since a flow diagram flows from the top down, a direction of the edge would be from the top shape to the lower shape. In addition, in some embodiments, the system may determine a position of a shape relative to other elements such as proximate edges, other shapes, a positioning within a page or diagram, or using any other suitable reference element. Accordingly, in 705, the system may then determine the logic flow of the operations based on the created edges between the determined shapes of the process flow diagram.

As noted, the processing steps described herein (e.g. processes 600 and 700) may be performed in any order, and one or more of such processing steps may be performed in parallel. For example, the determination of the relative positioning of each node may be performed at substantially the same time (or prior to, or after) the shape detection. As another example, the creation of edges may be performed at substantially the same time (or prior to, or after) the shape detection. In one embodiment, the shape detection may be performed after the edge creation process, and such edge information, may be used as part of the shape detection process. For example, the system may consider the ordering of elements (e.g. based on the edges) to predict the intended shape. For instance, the shape determining process may determine that an action operation (or shape) often proceeds a trigger operation (or shape). In addition, in one embodiment, the determination of the relative positioning of shapes may be performed as part of the shape detection algorithm. For example, a determination of a trigger operation may provide an indication that two lower adjacent shapes may correspond to branches of the trigger operation (e.g. nodes 404 and 403), or vice versa.

Referring back to FIG. 6, once the system has determined the intended logic flow of the operations in the hand-drawn image, the system may provide the converted results within an automation building tool. Accordingly, in 604, the system may display, within the automation building tool, the determined operations and logic flow as visual programming logic for a program (e.g. as shown in FIG. 5). In addition, as described, the visual programming logic may be represented as a graph. In one embodiment, the graph may be a directed acyclic graph (DAG).

As described, in some embodiments, the system may perform a verification (or validation) to ensure a converted diagram may be imported into a program. For example, the system may verify the determined operations and logic flow satisfy one or more rules for inserting the visual programming logic within the program. For example, the system may determine whether the programming logic may be inserted into a particular insertion point with the DAG.

In one embodiment, the system may determine whether the converted operations (e.g. portion of visual programming logic) may be validity inserted into a program based on one or more rules or criteria. In one embodiment, the validity determination may be based on a combination of a set of rules. For example, as a first rule, the system may determine whether the converted operations include only one open source (or entry path). As a second rule, the system may determine whether the converted operations include only one open destination (or exit path). As a third rule, the system may determine whether the converted operations are connected, or a comprises a single structure (e.g. not a disconnected set of nodes). As a fourth rule, the system may determine whether the number of converted operations is within a predefined limit. Accordingly, the system may determine whether operations specified within a process flow diagram may be incorporated as programming logic based on a combination of such rules. For example, the system may determine the selected set of operations are valid if the first to third rules are satisfied, or if all four rules are satisfied, etc.

It should be noted that, in some embodiments, the system performs a conversion of a hand-drawn image (e.g. non-digital image) into visual programming logic presented within an automation building tool. Accordingly, in some embodiments, the processes described herein that perform such a conversion are necessarily rooted in computing technology. Moreover, such processes may rely and various computing components including, but not limited to, a scanner, camera, machine learning components, and a software building tool.

Accordingly, in some embodiments, described is a system that provides an efficient and user-friendly mechanism for automatically converting an image to visual programming logic within an automation building tool.

As described, one or more embodiments may be used in conjunction with an on-demand database service.

Figure 8:
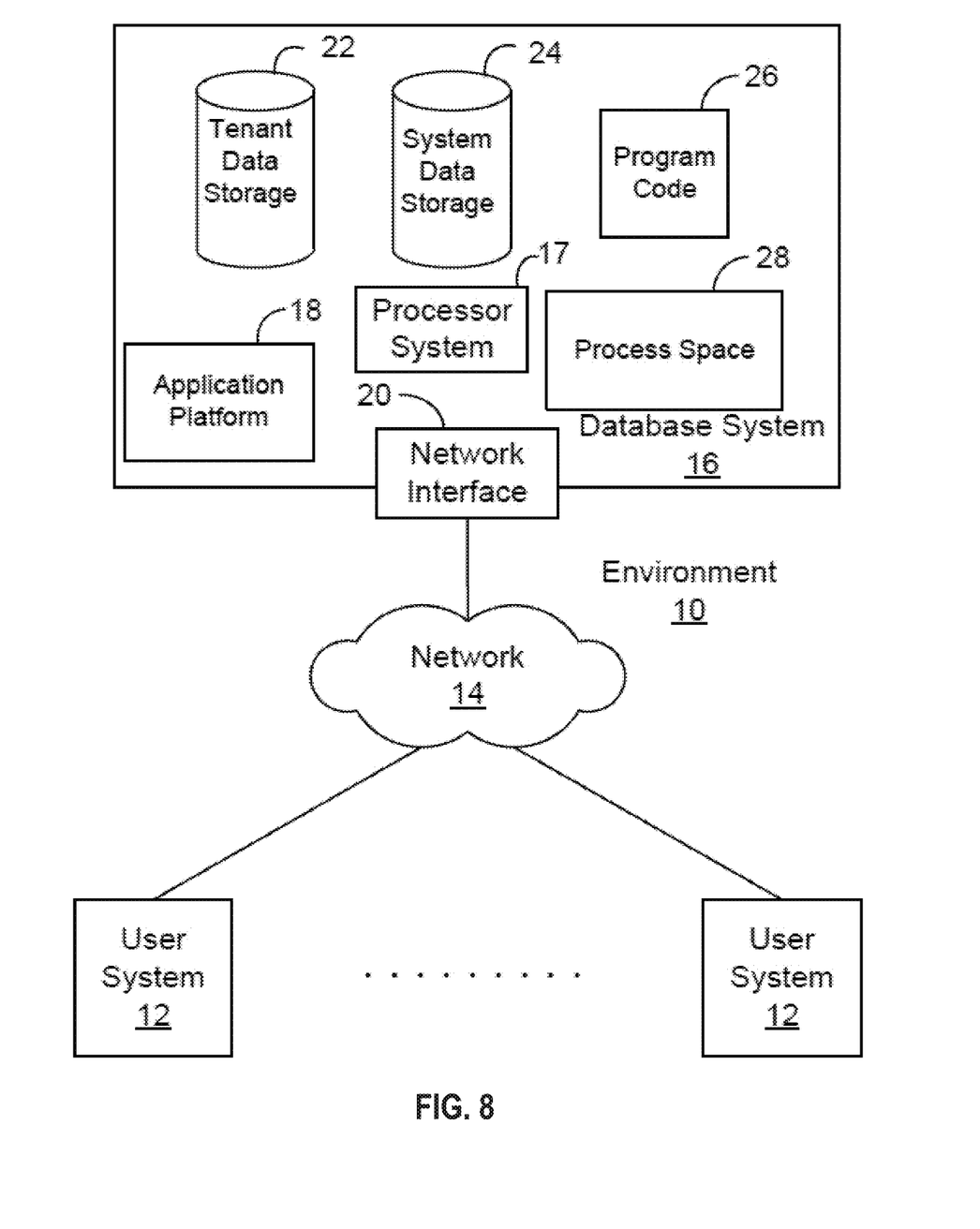
FIG. 8 is a block diagram illustrating of an example environment in which on-demand database services may be used in conjunction with one or more embodiments of the disclosure.

FIG. 8 is a block diagram illustrating of an example environment 10 in which on-demand database services may be provided to be used in conjunction with one or more embodiments of the disclosure.

Environment 10 may include user systems 12, network 14, database system 16, processor system 17, application platform 18, network interface 20, tenant data storage (or data store) 22, system data storage (or data store) 24, program code 26, and process space 28. In other embodiments, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As shown, user systems 12 might interact via a network 14 with an on-demand database service, which is implemented, in this example, as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some embodiments, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some embodiments, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one embodiment, system 16 may implement a web-based CRM system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

In one embodiment, an arrangement for elements of system 16 may include a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in this example include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one embodiment, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the embodiments described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed embodiments can be realized in any programming language that can be executed on a client system and/or server or server system such as, for example, C, C++, HTML, any other markup language, Java, JavaScript, ActiveX, any other scripting language, such as VBScript, and many other programming languages as are well known may be used.

According to some embodiments, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 9:
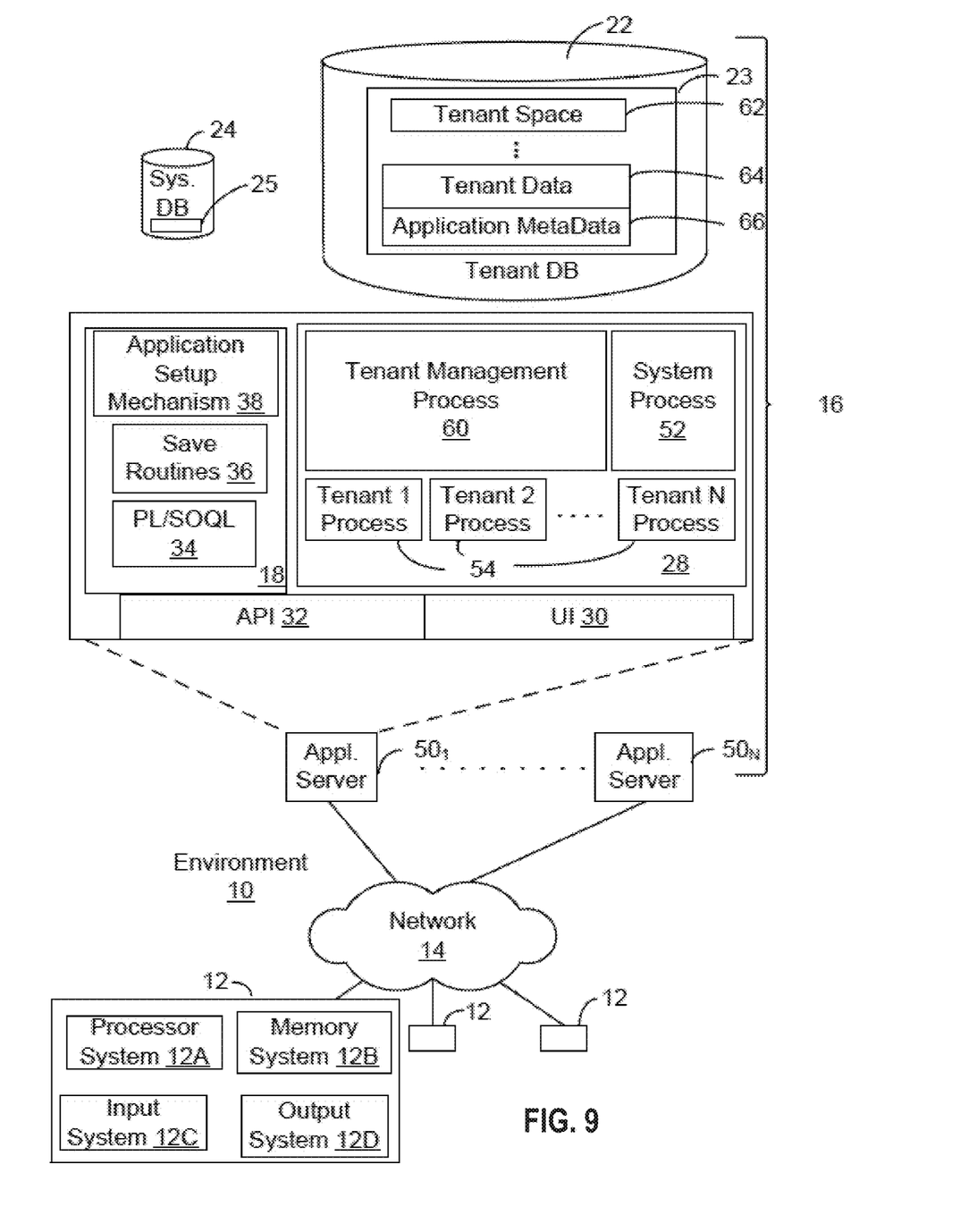
FIG. 9 is a block diagram illustrating an of example of elements of FIG. 8 and various possible interconnections between these elements according to one or more embodiments of the disclosure.

FIG. 9 is a block diagram illustrating an of example of elements of FIG. 8 and various possible interconnections between these elements according to one or more embodiments of the disclosure.

As shown, elements of system 16 and various interconnections in some embodiments are further illustrated. As shown, in one embodiment, the user system 12 may include processor system 12A, memory system 12B, input system 12C, and output system 12D. This example shows network 14 and system 16, and also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 50₁-50N, system process space 52, tenant process spaces 54, tenant management process space 60, tenant storage space 62, user storage 64, and application metadata 66. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown in this example, system 16 may include a network interface 20 implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Figure 10:
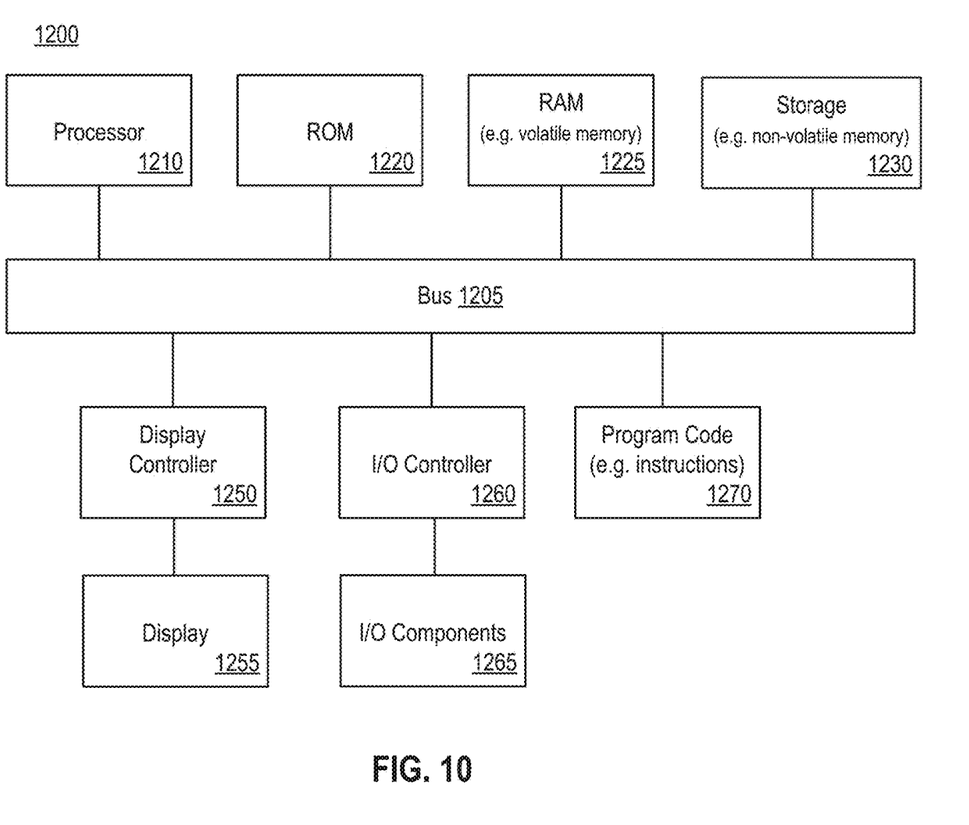
FIG. 10 is a block diagram illustrating an example of a computing system that may be used in conjunction with one or more embodiments of the disclosure.

FIG. 10 shows a block diagram of an example of a computing system that may be used in conjunction with one or more embodiments of the disclosure. For example, computing system 1200 (or system, or server, or computing device, or device) may represent any of the devices or systems (e.g. system 160, system 16, automation building tool 191, etc.) described herein that perform any of the processes, operations, or methods of the disclosure. As referred to herein, a system, for example, with reference to the claims, may include one or more computing systems that may include one or more processors. Note that while the computing system 1200 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor (or processors) 1210 may retrieve stored instructions from one or more of the memories 1220, 1225, and 1230 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein. As referred to herein, for example, with reference to the claims, a processor may include one or more processors. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 may represent any of the instructions, applications, software, libraries, toolkits, modules, components, engines, units, functions, logic, etc. as described herein. Program code 1270 may reside, completely or at least partially, within the memories described herein (e.g. non-transitory computer-readable media), or within a processor during execution thereof by the computing system. Program code 1270 may include both machine code, such as produced by a compiler, and files containing higher-level or intermediate code that may be executed by a computing system or other data processing apparatus (or machine) using an interpreter. In addition, program code 1270 can be implemented as software, firmware, or functional circuitry within the computing system, or as combinations thereof. Program code 1270 may also be downloaded, in whole or in part, through the use of a software development kit or toolkit that enables the creation and embodiment of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
      receive, by the system and within an automation building tool that is used to create a program, an image of a hand-drawn process flow diagram, the process flow diagram including a plurality of nodes not having a connection between each of the plurality of nodes, each node representing an operation to be performed by a program;
      traverse through one or more portions of the process flow diagram starting from a top of the process flow diagram to a bottom of the process flow diagram;
      determine a shape of each node detected in the process flow diagram, the shape of each node corresponding to an operation;
      identify a topmost shape within each portion and one or more shapes within a predefined proximity to the topmost shape within each portion;
      determine whether the shape of a node corresponds to a trigger operation and whether there is more than one lower shape in the hand-drawn process flow diagram proximate to the node corresponding to the trigger operation that correspond to the branches of the trigger operation;
      create edges between the topmost shape and the one or more proximate shapes within each portion, based on a position of each proximate shape relative to the topmost shape; and
      determine the logic flow of the operations based on the created edges between the determined shapes of the process flow diagram; and
      cause, within the automation building tool, the determined operations and logic flow to be displayed as visual programming logic for the program, the visual programming logic represented as a directed acyclic graph (DAG).

2. The system of claim 1, wherein the image of the hand-drawn process flow diagram is provided as an image file uploaded from a user system.

3. The system of claim 1, wherein the shape of each node is determined by selecting a shape that most closely matches a shape from a predefined set of shapes, the predefined set of shapes includes a unique shape for a predefined set of operations available within the automation building tool.

4. The system of claim 3, wherein the predefined set of operations available within the automation building tool includes at least a start operation, an end operation, an action operation, the trigger operation, and a rule operation.

5. The system of claim 1, the plurality of instructions when executed further causing the one or more processors to:
   receive, within the automation building tool, a selection to import the image into the program, the selection specifying an insertion point to insert the visual programming logic within the DAG.

6. The system of claim 5, the plurality of instructions when executed further causing the one or more processors to:
verify the determined operations and logic flow satisfy one or more rules for inserting the visual programming logic within the DAG at the specified insertion point.

7. The system of claim 1, the plurality of instructions when executed further causing the one or more processors to:
receive a set of training data including one or more labeled shapes; and
train a machine learning component to classify images based on the training data.

8. A computer program product comprising a non-transitory computer-readable medium having a computer readable program code embodied therein to be executed by one or more processors, the program code including instructions to:
receive, by the system and within an automation building tool that is used to create a program, an image of a hand-drawn process flow diagram, the process flow diagram including a plurality of nodes not having a connection between each of the plurality of nodes, each node representing an operation to be performed by a program;
traverse through one or more portions of the process flow diagram starting from a top of the process flow diagram to a bottom of the process flow diagram;
determine a shape of each node detected in the process flow diagram, the shape of each node corresponding to an operation;
identify a topmost shape within each portion and one or more shapes within a predefined proximity to the topmost shape within each portion;
determine whether the shape of a node corresponds to a trigger operation and whether there is more than one lower shape in the hand-drawn process flow diagram proximate to the node corresponding to the trigger operation that correspond to the branches of the trigger operation;
create edges between the topmost shape and the one or more proximate shapes within each portion, based on a position of each proximate shape relative to the topmost shape; and
determine the logic flow of the operations based on the created edges between the determined shapes of the process flow diagram; and
cause, within the automation building tool, the determined operations and logic flow to be displayed as visual programming logic for the program, the visual programming logic represented as a directed acyclic graph (DAG).

9. The computer program product of claim 8, wherein the shape of each node is determined by selecting a shape that most closely matches a shape from a predefined set of shapes, the predefined set of shapes includes a unique shape for a predefined set of operations available within the automation building tool.

10. The computer program product of claim 9, wherein the predefined set of operations available within the automation building tool includes at least a start operation, an end operation, an action operation, the trigger operation, and a rule operation.

11. The computer program product of claim 8, wherein the program code includes further instructions to:
receive, within the automation building tool, a selection to import the image into the program, the selection specifying an insertion point to insert the visual programming logic within the DAG.

12. The computer program product of claim 11, wherein the program code includes further instructions to:
verify the determined operations and logic flow satisfy one or more rules for inserting the visual programming logic within the DAG at the specified insertion point.

13. A method comprising:
receiving, by the system and within an automation building tool that is used to create a program, an image of a hand-drawn process flow diagram, the process flow diagram including a plurality of nodes not having a connection between each of the plurality of nodes, each node representing an operation to be performed by a program;
traversing through one or more portions of the process flow diagram starting from a top of the process flow diagram to a bottom of the process flow diagram;
determining a shape of each node detected in the process flow diagram, the shape of each node corresponding to an operation;
identifying a topmost shape within each portion and one or more shapes within a predefined proximity to the topmost shape within each portion;
determining whether the shape of a node corresponds to a trigger operation and whether there is more than one lower shape in the hand-drawn process flow diagram proximate to the node corresponding to the trigger operation that correspond to the branches of the trigger operation;
creating edges between the topmost shape and the one or more proximate shapes within each portion, based on a position of each proximate shape relative to the topmost shape; and
determining the logic flow of the operations based on the created edges between the determined shapes of the process flow diagram; and
causing, within the automation building tool, the determined operations and logic flow to be displayed as visual programming logic for the program, the visual programming logic represented as a directed acyclic graph (DAG).

14. The method of claim 13, wherein the shape of each node is determined by selecting a shape that most closely matches a shape from a predefined set of shapes, the predefined set of shapes includes a unique shape for a predefined set of operations available within the automation building tool.

15. The method of claim 14, wherein the predefined set of operations available within the automation building tool includes at least a start operation, an end operation, an action operation, the trigger operation, and a rule operation.

16. The method of claim 13, further comprising:
receiving, within the automation building tool, a selection to import the image into the program, the selection specifying an insertion point to insert the visual programming logic within the DAG.

17. The method of claim 16, further comprising:
verifying the determined operations and logic flow satisfy one or more rules for inserting the visual programming logic within the DAG at the specified insertion point.

* * * * *